United States Patent
Ludlow et al.

(10) Patent No.: US 10,685,051 B2
(45) Date of Patent: Jun. 16, 2020

(54) RECONFIGURABLE MODEL FOR AUTO-CLASSIFICATION SYSTEM AND METHOD

(71) Applicant: Open Text Corporation, Waterloo (CA)

(72) Inventors: Stephen Ludlow, Montreal (CA); Steve Pettigrew, Montreal (CA); Alex Dowgailenko, Montreal (CA); Agostino Deligia, Montreal (CA); Isabelle Giguere, Montreal (CA)

(73) Assignee: Open Text Corporation, Waterloo (CA)

( * ) Notice: Subject to any disclaimer, the term of this patent is extended or adjusted under 35 U.S.C. 154(b) by 736 days.

(21) Appl. No.: 14/987,234

(22) Filed: Jan. 4, 2016

(65) Prior Publication Data
US 2016/0117608 A1    Apr. 28, 2016

Related U.S. Application Data

(63) Continuation of application No. 13/665,622, filed on Oct. 31, 2012, now Pat. No. 9,256,836.

(51) Int. Cl.
| G06N 99/00 | (2019.01) |
| G06F 16/35 | (2019.01) |
| G06N 20/00 | (2019.01) |
| G06F 16/93 | (2019.01) |
| G06F 16/25 | (2019.01) |
| G06F 16/28 | (2019.01) |
| G06F 3/0482 | (2013.01) |
| G06F 3/0484 | (2013.01) |

(52) U.S. Cl.
CPC ............ *G06F 16/35* (2019.01); *G06F 3/0482* (2013.01); *G06F 3/04842* (2013.01); *G06F 16/258* (2019.01); *G06F 16/285* (2019.01); *G06F 16/93* (2019.01); *G06N 20/00* (2019.01); *G06N 99/00* (2013.01)

(58) Field of Classification Search
CPC .................................................. G06N 99/005
USPC ...................................................... 706/59, 12
See application file for complete search history.

(56) References Cited

U.S. PATENT DOCUMENTS

| 6,137,911 A | 10/2000 | Zhilyaev |
| 6,212,532 B1 | 4/2001 | Johnson |
| 6,243,723 B1 | 6/2001 | Ikeda et al. |
(Continued)

FOREIGN PATENT DOCUMENTS

CA    2794103 A1    4/2014

OTHER PUBLICATIONS

Siersdorfer et al ("Automated Retraining Methods for Document Classification and Their Parameter Tuning" 2005).*
(Continued)

*Primary Examiner* — Lut Wong
(74) *Attorney, Agent, or Firm* — Sprinkle IP Law Group

(57) ABSTRACT

A reconfigurable automatic document-classification system and method provides classification metrics to a user and enables the user to reconfigure the classification model. The user can refine the classification model by adding or removing exemplars, creating, editing or deleting rules, or performing other such adjustments to the classification model. This technology enhances the overall transparency and defensibility of the auto-classification process.

20 Claims, 4 Drawing Sheets

(56) References Cited

U.S. PATENT DOCUMENTS

| | | |
|---|---|---|
| 6,397,205 B1 | 5/2002 | Juola |
| 6,519,580 B1 | 2/2003 | Johnson et al. |
| 6,553,365 B1 | 4/2003 | Summerlin et al. |
| 6,592,627 B1 | 7/2003 | Agrawal et al. |
| 6,668,256 B1 | 12/2003 | Lynch |
| 6,718,333 B1 | 4/2004 | Matsuda |
| 6,789,069 B1 | 9/2004 | Barnhill et al. |
| 6,792,415 B2 | 9/2004 | Shih et al. |
| 6,868,411 B2 | 3/2005 | Shanahan |
| 7,000,178 B2 | 2/2006 | Unchida et al. |
| 7,028,250 B2 | 4/2006 | Ukrainczyk et al. |
| 7,039,856 B2 | 5/2006 | Peairs et al. |
| 7,065,514 B2 | 6/2006 | Yang-Stephens et al. |
| 7,139,695 B2 | 11/2006 | Castellanos |
| 7,185,008 B2 | 2/2007 | Kawatani |
| 7,194,471 B1 | 3/2007 | Nagatsuka et al. |
| 7,275,052 B2 | 9/2007 | Peh |
| 7,283,998 B2 | 10/2007 | Moon et al. |
| 7,376,635 B1 | 5/2008 | Porcari et al. |
| 7,496,567 B1 | 2/2009 | Steichen |
| 7,499,591 B2 | 3/2009 | Simske et al. |
| 7,574,409 B2 | 8/2009 | Patinkin |
| 7,711,747 B2 | 5/2010 | Renders et al. |
| 7,734,554 B2 | 6/2010 | Simske et al. |
| 7,899,816 B2 | 3/2011 | Kolo et al. |
| 7,899,871 B1 | 3/2011 | Kumar et al. |
| 7,933,859 B1 | 4/2011 | Puzicha et al. |
| 8,311,960 B1 | 11/2012 | Ginzburg et al. |
| 8,787,681 B1 | 7/2014 | Rubio |
| 9,256,836 B2 | 2/2016 | Ludlow et al. |
| 9,348,899 B2 | 5/2016 | Ludlow et al. |
| 9,760,634 B1 | 9/2017 | Joshi |
| 10,235,453 B2 | 3/2019 | Simard et al. |
| 2004/0083224 A1 | 4/2004 | Yoshida |
| 2005/0021357 A1 | 1/2005 | Schuetze et al. |
| 2006/0248054 A1 | 11/2006 | Kirshenbaum |
| 2006/0287993 A1* | 12/2006 | Yao .................. G06F 16/24578 |
| 2007/0067258 A1 | 3/2007 | Theilmann |
| 2008/0075352 A1 | 3/2008 | Shibuya et al. |
| 2009/0089305 A1 | 4/2009 | Summerlin et al. |
| 2009/0116736 A1 | 5/2009 | Neogi et al. |
| 2010/0257127 A1* | 10/2010 | Owens .................. G06N 7/005 |
| | | 706/12 |
| 2010/0262571 A1 | 10/2010 | Schmidtler et al. |
| 2011/0040837 A1 | 2/2011 | Eden et al. |
| 2012/0054658 A1 | 3/2012 | Chuat et al. |
| 2012/0150773 A1 | 6/2012 | Dicorpo et al. |
| 2012/0303558 A1* | 11/2012 | Jaiswal .................. G06N 20/00 |
| | | 706/12 |
| 2014/0122410 A1 | 5/2014 | Ludlow et al. |
| 2014/0122486 A1 | 5/2014 | Simard et al. |
| 2019/0179843 A1 | 6/2019 | Simard |

OTHER PUBLICATIONS

Office Action for U.S. Appl. No. 13/665,607, dated Jan. 27, 2014, 42 pages.

Chu et al. "Foundations and Advances in Data Mining, Section Web Page Classification," Springer Mar. 2005, ISBN-3-540-25057-3, 64 pgs.

Office Action for U.S. Appl. No. 13/665,607, dated Apr. 29, 2014, 49 pgs.

Office Action for U.S. Appl. No. 13/665,622, dated Jul. 23, 2014, 13 pgs.

Cetintemel et al. "Self-Adaptive User Profiles for Large-Scale Data Delivery," 2000, 12 pgs.

Chen et al. "An Information Retrieval System Based on a User Profile," The Journal of Systems and Software 54, 2000, pp. 3-8.

Siersdorfer et al. "Automated Retraining Methods for Document Classification and their Parameter Tuning," 2005, pp. 478-486.

Zhang et al. "Exploration and Exploitation in Adaptive Filtering Based on Baesian Active Learning," Proceedings of the Twentieth International on Machine Learning (ICML-2003), 8 pages.

Chen et al. "PVA: A Self-Adaptive Personal View Agent," Journal of Intelligent Information Systems, (2002) pp. 173-194.

Office Action for U.S. Appl. No. 13/665,607, dated Aug. 6, 2014, 46 pages.

Office Action for U.S. Appl. No. 13/665,622, dated Nov. 3, 2014, 17 pgs.

Office Action for U.S. Appl. No. 13/665,607, dated Nov. 26, 2014, 59 pgs.

Notice of Allowance for U.S. Appl. No. 13/665,622, dated Mar. 16, 2015, 2 pgs.

Office Action for U.S. Appl. No. 13/665,607, dated Mar. 19, 2015, 53 pgs.

Office Action for U.S. Appl. No. 13/665,607, dated Aug. 19, 2015, 61 pgs.

Office Action for U.S. Appl. No. 15/148,717, dated May 14, 2018, 24 pgs.

Notice of Allowance for U.S. Appl. No. 13/665,607, dated Jan. 22, 2016, 14 pgs.

Notice of Allowance issued for U.S. Appl. No. 15/148,717, dated Oct. 30, 2018, 16 pages.

Office Action Issued for Canadian Application no. 2,794,101, dated Feb. 13, 2019, 8 pages.

Offfice Action for Canadian Patent Application No. 2794103, dated Oct. 26, 2017, 6 pgs.

Office Action for Canadian Patent Application No. 2794101, dated Feb. 19, 2018, 5 pgs.

Office Action for Canadian Patent Application No. 2794103, dated Sep. 04, 2018, 6 pgs.

\* cited by examiner

RECONFIGURABLE MODEL FOR AUTO-CLASSIFICATION SYSTEM AND METHOD

CROSS-REFERENCE TO RELATED APPLICATION(S)

This application is a continuation of, and claims a benefit of priority under 35 U.S.C. 120 of the filing date of U.S. patent application Ser. No. 13/665,622, filed Oct. 31, 2012, now U.S. Pat. No. 9,256,836, entitled "RECONFIGURABLE MODEL FOR AUTO-CLASSIFICATION SYSTEM AND METHOD," which is incorporated by reference herein for all purposes. This application relates to U.S. patent application Ser. No. 13/665,607, filed Oct. 31, 2012, now U.S. Pat. No. 9,348,899, entitled "AUTO-CLASSIFICATION SYSTEM AND METHOD WITH DYNAMIC USER FEEDBACK," which is fully incorporated herein by reference for all purposes.

TECHNICAL FIELD

The present technology relates generally to computer systems and information technology and, in particular, auto-classification of electronic documents or digital content.

BACKGROUND

In the information age, storage and management of electronic documents (digital content) is an increasingly challenging problem.

Classification of electronic documents was originally a manual task—the function of classifying an electronic document to determine whether and for how long to archive the document was performed by the document's author or by some other records manager or archivist.

For records managers and others responsible for building and enforcing document classification policies, retention schedules, and other aspects of a records management program, the problem with traditional manual classification methods is that content needs to be understood to determine why and for how long it must be retained. Managing the retention and destruction of information reduces litigation risk, reduces e-discovery and digital archiving costs, and ensures compliance with any regulatory standards.

Many users view the process of sorting records from transient content as time-consuming and sometimes even exasperating. In addition, the ubiquity of mobile devices and social media applications makes it difficult to build standard classification tools into end-user applications.

Furthermore, records managers also struggle with enforcing policies that rely on manual, human-based approaches. Accuracy and consistency in applying classification is often inadequate when left to users, the costs in terms of productivity loss are high, and these issues, in turn, result in increased business and legal risk as well as the potential for the entire records management program to quickly become unsustainable in terms of its ability to scale.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

SUMMARY

Figure 1:
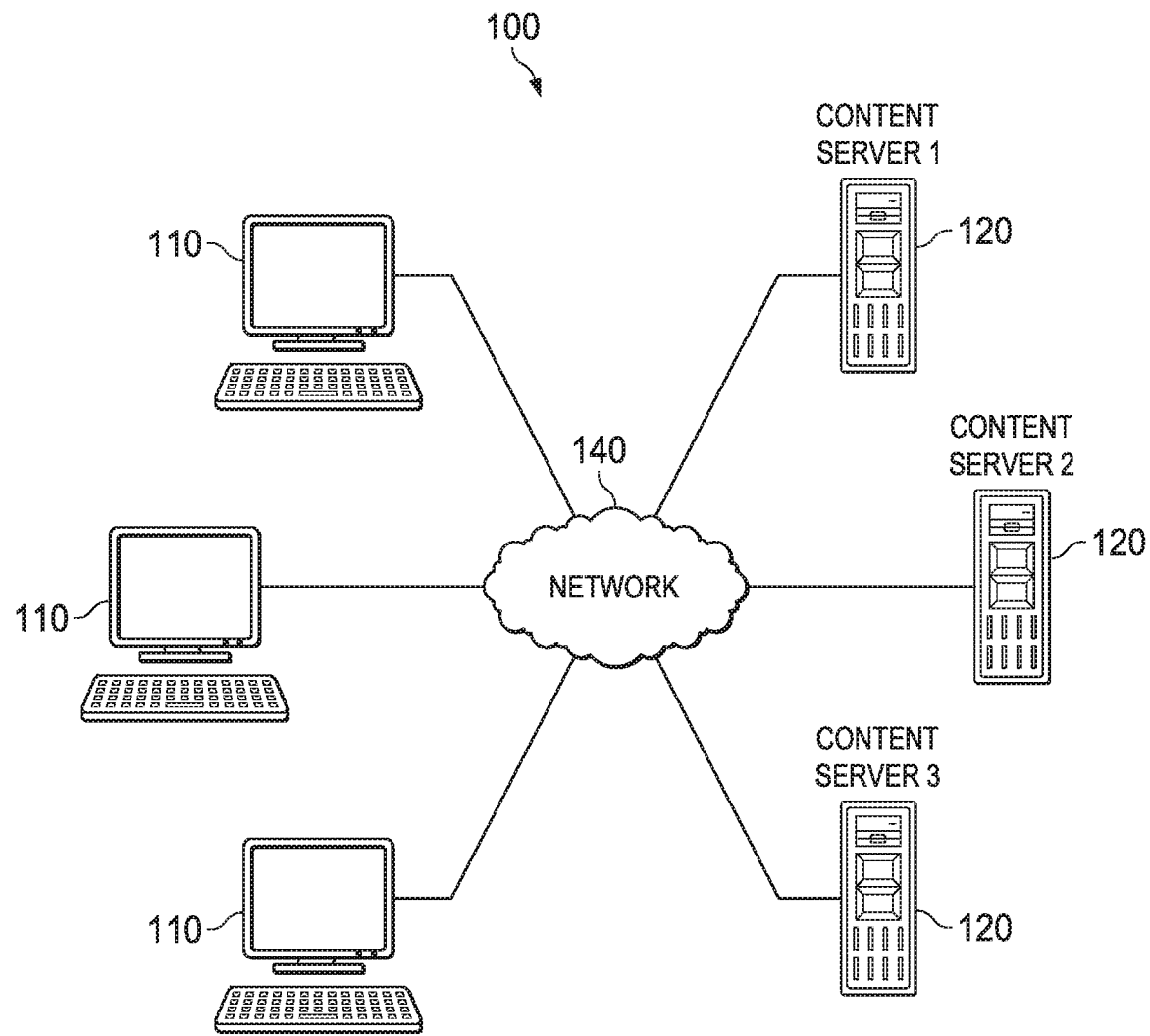
FIG. 1 is a schematic depiction of a networked computer system on which embodiments of the inventive subject matter may be implemented.

The inventive subject matter provides methods, systems, and computer-readable media for auto-classifying digital content by providing dynamic user feedback that enables the user to adjust the classification algorithm to achieve more optimal classification results.

One aspect of the inventive subject matter includes a computer-implemented method of automatically classifying digital content, the method comprising creating a classification model based on one or more selected documents that have been identified as exemplars, displaying metrics for a plurality of other documents that have been classified using the classification model, and receiving user input to reconfigure the classification model.

Another aspect of the inventive subject matter includes a computer-readable medium comprising programmed instructions in code which, when loaded into a memory and executed by a processor of a computing device, causes the computing device to create a classification model based on one or more selected documents that have been identified as exemplars, display metrics for a plurality of other documents that have been classified using the classification model, and receive user input to reconfigure the classification model.

Yet a further aspect of the inventive subject matter includes an auto-classification system (or automatic document classification system) comprising a processor coupled to a memory for creating a classification model based on one or more selected documents that have been identified as exemplars and a display for displaying metrics for a plurality of other documents that have been classified using the classification model and for receiving user input to configure the classification model.

A further aspect of the inventive subject matter includes a computer-implemented method of automatically classifying digital content that entails generating a classification model based on one or more selected documents that have been identified as exemplars, displaying metrics indicative of a precision of the classification model for a plurality of other documents that have been classified using the classification model, and receiving user input to reconfigure the classification model by removing or adding exemplars or by removing or adding rules.

A further aspect of the inventive subject matter includes a computer-implemented method of automatically classifying digital content that entails receiving user input to identify one or more documents as exemplars, receiving user input to cause a classification model to be generated based on the exemplars, receiving user input to cause run a classification test using the classification model, displaying metrics for the classification test, and receiving user input to reconfigure the classification model.

The details and particulars of these aspects of the inventive subject matter will now be described below, by way of example, with reference to the attached drawings.

DETAILED DESCRIPTION

Embodiments of the inventive subject matter, which are described below, enable various new techniques and approaches pertaining to the auto-classification of digital content or electronic documents.

By way of overview, and to place the novel technology in its proper context, the novel technology should be understood as being part of one or more processes of auto-classifying digital content. The improved technology provides a reconfigurable auto-classification model that enables a user of the auto-classification system to quickly, easily and efficiently reconfigure or refine the auto-classification model. As will be explained below, reconfiguring the model may be accomplished by adding or removing exemplars, adding or removing rules, or by performing other adjustments, refinements or corrections to the classification model.

This reconfigurability of the auto-classification model may be enhanced by using this technology in conjunction with dynamic user feedback in the form of an onscreen guide that indicates recommended actions to enable the user to refine the auto-classification model. However, the classification model may be reconfigured by the user without regard to the recommended actions suggested by the dynamic user feedback or onscreen guide. In other words, while the reconfigurable model works optimally with the dynamic feedback guide, the dynamic feedback guide is not required for implementing the present technology. Reconfiguring of the model may be done by viewing the displayed metrics (e.g., precision and recall values) and by taking any remedial or corrective actions to adjust the model. The dynamic user guide, if utilized, provides recommended actions for the user to refine the model. The dynamic user guide, for example, acts as an expert system that suggests actions to take that would improve the precision and recall. The model is nonetheless reconfigurable without the recommendation actions of the guide. Therefore, it should be understood that the dynamic feedback guide facilitates the reconfigurability of the model but is not required for the user to reconfigure the model.

As will elaborated below, the inventive subject matter in general provides a novel computer-implemented method of automatically classifying digital content that comprises creating a classification model based on one or more selected documents that have been identified as exemplars, displaying metrics for a plurality of other documents that have been classified using the classification model, and receiving user input to reconfigure the classification model. Also disclosed herein is a computer-readable medium for performing this method as well as an auto-classification system for automatically classifying documents or other digital content that creates a classification model based on documents identified as exemplars, displays metrics for a plurality of other documents classified using the classification model, and then permits the model to be reconfigured by receiving further user input.

FIG. 1 schematically depicts an exemplary computer network environment 100 for implementing embodiments of the inventive subject matter. In main embodiments, a computer-based auto-classification system includes client computers 110 which communicate through a network 140 with one or more content servers 120 to obtain digital content (electronic documents) stored on the one or more content servers 120. The computer-implemented method may be performed by the client computers 110 illustrated in this example to classify content stored on the content servers.

In other embodiments, the content to be classified may be stored in a memory of the client computer itself.

In other embodiments, the content may be stored on a removable memory device, on the cloud, or in any other location accessible by the computer 110.

In yet other embodiments, the client computers 110 may act as terminals, hypertext browser clients, graphical display clients, or other networked clients to the server 120. For example, a web browser application at the client computers 110 may support interfacing with a web server application at the server 120. Such a browser may use controls, plug-ins, or applets to support interfacing to the server 120. The client computers 110 can also use other customized programs, applications, or modules to interface with the server 120. The client computers 110 can be desktop computers, laptops, handhelds, mobile devices, mobile telephones, television set-top boxes, kiosks, servers, terminals, thin-clients, or any other computerized devices.

The network 140 may be any data communications network capable of supporting data communications between the client computers 110 and the servers 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, the Internet (or the World Wide Web), a LAN, WAN, MAN, or any other network for interconnecting computers. To support high volume and load, a distributed computing environment may be implemented by using networking technologies that may include, but are not limited to, TCP/IP, RPC, RMI, HHTP, Web Services (XML-RPC, JAX-RPC, SOAP, etc.).

Although the computer 110 in most embodiments obtains the documents directly from one of the content servers 120, in another embodiment the system may optionally include an ingestion broker between the content server and the computer that ingests, parses, processes, normalizes and/or stores documents for building models, testing the models and for running classification jobs. The ingestion broker supports extraction of textual content from static or binary files (like PDF and Microsoft Office documents) in the ingestion queue, and also supports chaining of transformers and processors. Optionally, during the ingestion process, the system can also call a content analytics module or any third-party text annotator in order to enrich documents with semantic annotations before they are imported for classification.

Figure 2:
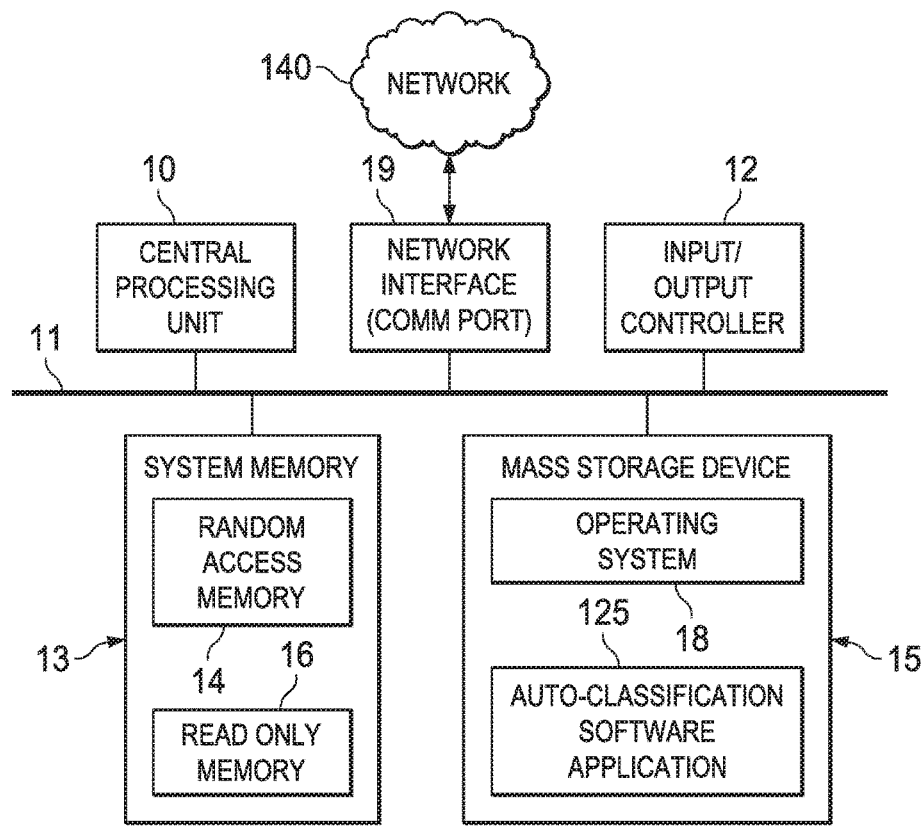
FIG. 2 is a schematic depiction of a computing device for implementing embodiments of the inventive subject matter.

Turning now to FIG. 2, an exemplary computer (also referred to herein as a computing device) can execute software components and modules for auto-classifying digital content. The computer architecture shown in FIG. 2 illustrates a conventional desktop, laptop, or server and may be utilized to execute aspects of the software components presented herein. It should be appreciated, however, that the described software components can also be executed on other computing devices such as mobile devices, handheld wireless communications devices, smart phones, tablets, set-top boxes, kiosks, etc.

The computer illustrated in FIG. 2 can include a central processing unit (CPU) 10, also referred to herein as a processor or microprocessor, a system memory 13 including a random access memory (RAM) 14 and a read-only memory (ROM) 16, and a system bus 11 that transfers data between the system memory 13 and the CPU 10. A basic input/output system (BIOS) containing the basic routines that help to transfer information between elements within the computer, such as during start-up, can be stored in the ROM 16. The computer may further include a mass storage device 15 for storing an operating system (OS) 18, software, data, and various program modules. The auto-classification software application 125 may be stored in the mass storage device 15.

The mass storage device 15 can be connected to the CPU 10 through a mass storage controller which is connected to the bus 11. The mass storage device 15 and its associated computer-readable media can provide non-volatile storage for the computer. Although the description of computer-readable media contained herein refers to a mass storage device, such as a hard disk, solid-state drive or CD-ROM drive, it should be appreciated by those skilled in the art that computer-readable media can be any available computer storage media that can be accessed by the computer.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the inventive subject matter, the computer may operate in a networked environment using logical connections to remote computers through the network 140 (e.g., the Internet). The computer may connect to the network 140 through a network interface 19 which may be a communications port such as a DSL or cable modem, Ethernet connection, or any suitable wired or wireless switch or router, etc. The network interface 19 is connected to the bus 11. It should be appreciated that the network interface unit 19 may also be utilized to connect to other types of networks and remote computer systems. The computer may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

A number of applications, program modules and data files may be stored in the mass storage device 15 and RAM 14 of the computer, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the auto-classification software application 125 for execution by the CPU 10. The auto-classification application 125 can include software components for implementing portions of the processes disclosed herein. The mass storage device 15, the ROM 16, and the RAM 14 may also store other types of program modules for accessing the documents on the content server.

Figure 3:
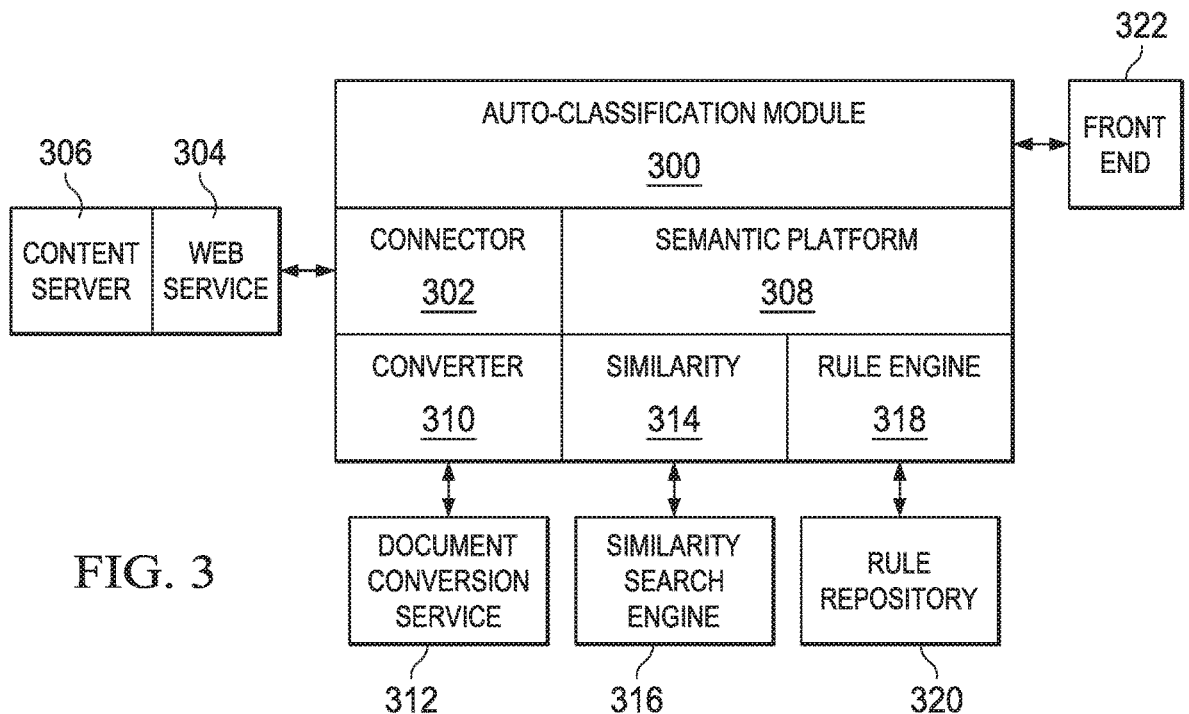
FIG. 3 is a schematic depiction of the architecture of the auto-classification system in accordance with one embodiment of the inventive subject matter.

Referring now to FIG. 3, a block diagram illustrates various exemplary components of one example architecture of an auto-classification system according to some embodiments of the inventive subject matter. As illustrated, the system includes an auto-classifier module 300 or engine that implements one or more algorithms for creating models, providing metrics, suggesting recommended actions and classifying documents based on a model. The system includes a connector 302 for communicating with a web service 304 of a content server 306. The system includes a semantic platform 308 for performing semantic analysis on the content for semantic-based classification. The system includes a converter 310 which communicates with a document conversion 312 service, a similar documents search module 314 that communicates with a similarity search engine 316 and a rule engine 318 that liaises with a rule repository 320. The auto-classification module may also have a front end 322 to provide one or more user interfaces. It should be understood that this architecture is presented solely by way of example and that other embodiments of this auto-classifier may have a different architecture.

Figure 4:
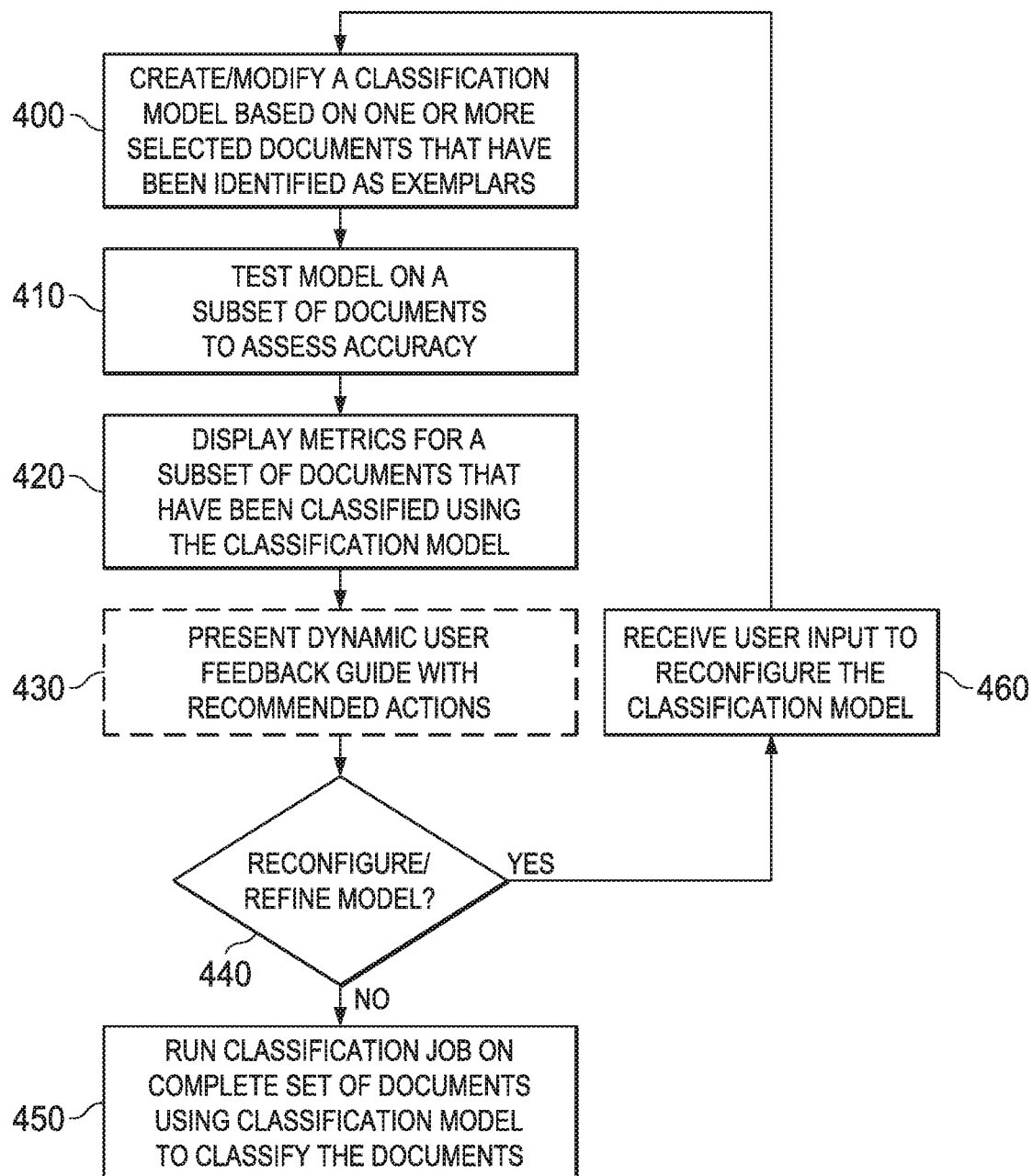
FIG. 4 is a flowchart depicting steps of a method of automatically classifying content in accordance with some embodiments of the inventive subject matter.

FIG. 4 is a flowchart depicting the general method of auto-classification in accordance with embodiments of the inventive subject matter. As depicted in FIG. 4, the method in general entails an initial step 400 of creating a classification model based on one or more selected documents that have been identified as exemplars. Alternatively, where an existing model has already been created, step 400 may entail modifying or even importing an existing model. The method then involves (at step 410) testing the model on a subset of documents to assess its accuracy. At step 420, the application displays metrics for the subset of documents that have been classified using the classification model. The method may optionally further involve (at step 430) presenting a dynamic user feedback guide that recommends or suggests remedial or corrective actions that the user may wish to consider to improve the accuracy of the classification model. The method then determines (at step 430) whether the user wishes to refine or reconfigure the model in view of the metrics and/or in view of the recommendations/suggestions presented in the (optionally displayed) dynamic user feedback guide. If no reconfigurations are desired by the user, then the method proceeds to step 450 in which the application runs a full classification job on the complete set of documents using the classification model to thereby classify documents according to the model. On the other hand, if the user wishes to reconfigures the model, the method proceeds to step 460 in which the application receives user input to reconfigure the classification model. The model may be reconfigured/modified by the user by, for example, changing the exemplars and/or rules as will be explained in greater detail below.

As will be explained below, the model may be built by importing exemplars (example documents) and by defining rules. After running a test classification on a small sample of documents using the model, and after the user has performed a manual review of a collection of the documents, the metrics are computed and presented on the user interface to inform the user as to the accuracy of the model. The system may then optionally display recommended actions to enable the user to improve the model's accuracy. These recommended actions may be optionally presented as part of a guide that provides user feedback on the model's classification performance. This optional guide may be understood as providing dynamic user feedback in the sense that the user can iteratively tweak the model and keep re-running the classifications to see how each change to the model improves the model's accuracy. Each time the user re-runs the classification, the guide will update the recommended actions to provide fresh feedback to the user based on the latest iteration of the model. With or without the optional feedback guide, the metrics themselves will enable users to determine whether the model is sufficiently accurate for their purposes and, if greater accuracy is sought, to reconfigure the model.

Various embodiments, aspects and embodiments of this technology will now be explained in greater detail below.

Metrics

The auto-classification system (auto-classifier) is configured to display metrics to the user the user can review for the purposes of determining whether the model is sufficiently accurate and for the further purposes of adjusting Or reconfiguring the classification model to improve its accuracy.

Metrics, or statistics, may be displayed by the auto-classification system on a user interface (screen) after running a classification on a set of documents, for instance, on a subset or sample of the corpus of documents that are to be automatically classified. These metrics help the user determine what changes should be made before classifying documents, for instance, before running an actual classification job. In one embodiment of this technology, the system provides one or more of the following metrics:

Match—a "match" is a document that has an assigned classification that is the same as the expected classification, which means that the auto-classification system has assigned the correct classification to the document.

Noise—"noise" represents the documents where a currently viewed classification was assigned, but a different classification was expected.

Silence—"silence" represents the documents where a currently viewed classification was expected, but a different classification, or no classification, was assigned.

Unclassified—"unclassified" is a subset of silence and represents the documents without an assigned classification.

Precision—"precision" is a property of the model, rather than a set of documents. Expressed in most embodiments as a percentage, it represents the proportion of assigned classifications that match the expected classifications. Precision is calculated using both the noise and match metrics, and is a very important measure of model accuracy. The results indicate the proportion of classified documents that will be correctly classified. The less noise a model has, the more precise the model is, which results in a higher accuracy level.

Recall—"recall" is a property of a model and represents the frequency with which the expected classification is assigned across all processed documents, not just those that had a classification. Recall is calculated using silence versus the number of matches. The results indicate the proportion of all documents that will be correctly classified when a classification job is run. Less silence results in a better recall number.

While it is useful to present all of these metrics, in other embodiments, the system may provide only a subset of these metrics. There may also be additional metrics (not mentioned above) in yet further embodiments of the system. Which metrics are presented and how these metrics are presented may be user-configurable.

In one embodiment, the system will report a confidence level. The confidence level refers to the auto-classification system's level of certainty that it has assigned the correct classification to a document. It is determined by comparing a document to a set of exemplars, adding the classifications for the exemplars, and calculating a confidence score based on the information.

In one specific embodiment, the confidence level may be assigned based on a plurality of predefined levels, for example five predefined levels, as shown by way of example in the following list: Unclassified [Level 1]; Poor [Level 2]; Fair [Level 3]; Good [Level 4]; and Very Good [Level 5]. In this particular example, when a document receives a confidence level of only "1", it means that the auto-classification system processed the document, but could not determine which classification to assign. Documents with a confidence level of "1" are thus not classified. A confidence level scoring of 1-5 is clearly only intended as one example of how confidence level scoring may be implemented.

At low confidence levels, the assigned classification has a low probability of being correct. However, some documents with low confidence levels could still be accurately classified. High confidence levels mean the assigned classification has a high probability of being correct. However, some documents could still be inaccurately classified. Reviewing the documents with the highest and lowest confidence levels can help the user locate errors that the auto-classification system has made. In some cases, these classifications could have ambiguous exemplars or rules. The guide may optionally indicate this to the user.

Creating and Managing Models

A model is notionally a container that holds a set of classified documents that are used as examples to train the model. These classified documents are called exemplars.

To begin the process of creating a model, on the auto-classification dashboard (or other user interface), the user selects a user interface element (e.g., clicks on "create a model"). In one embodiment, a model creation assistant wizard is launched to guide the user through the model creation process. In one embodiment, this wizard prompts the user to type a name and description for the model. To create the model, the user adds documents as exemplars from the content server (or other document source). The user may also optionally create rules. Thus, the model requires at least one exemplar although better results are achieved by using a plurality of exemplars. Rules may be added to dictate certain classifications, as will be explained below. In most embodiments, the system enables the models to be deleted, viewed and edited.

In one embodiment, auto-classification involves a classification tree with nodes and branches. This tree is used to create a taxonomy (hierarchical classification scheme) for classifying content into classes and subclasses and sub-subclasses, etc. Exemplars are needed for each classification of a given tree.

The model creation process may also request that the user select the classifications that are to be imported into the model. The model creation process may also request that the user choose whether to allow sampling to automatically select test documents. When the sampling option is enabled, the auto-classification system automatically selects a set of exemplars to use as test documents. These test documents are chosen randomly from the documents that are imported into the model at the time it is created. If the user does not want test documents to be automatically chosen, the user can select the test. In one embodiment, when the model creation begins, a status window opens to show the status of the options that have been selected.

Each document identified as an exemplar and that is added to a model as such represents the classification to which it is assigned. The auto-classification system uses the exemplars as a basis for recognizing similar content and attributes for subsequently classifying other documents. When the user selects documents (in a content server or elsewhere) that are to be automatically classified, the auto-classification system compares the documents to the exemplars and automatically assigns the appropriate classification if the characteristics are a close enough match.

After a model is created, the system permits the user to add more exemplars. This may, for example, be done in response to the guide presenting a recommended action to the user to add more exemplars. In one specific embodiment, the user interface of the auto-classification system may provide an Add Document button (or it may provide any other equivalent user interface element for this functionality). In this particular embodiment, an Add Documents Assistant may be displayed to guide the user through the process of adding a document as an additional exemplar. In this embodiment, the Add Document Assistant may include the following functions:

(i) Select Classification(s), which displays a list of available classification trees in the content server. This enables the user to select individual classifications or to select an entire classification tree, and to import all of the documents with that classification assigned. The auto-classification system can be configured to retrieve documents with the specified classification from every location in the content server. Content may also be imported into the auto-classification system from any other content source or repository, e.g., content management systems (CMS), file systems, etc.

(ii) Sampling Settings, which, when enabled, allow the system to select a random set of documents from the set of documents being imported, and convert them to test documents. Test documents are used to test the model's accuracy before creating an actual classification job. If the user does not want test documents automatically selected, this sampling feature may be disabled when adding exemplars.

(iii) Classification Settings, which allows the user to run a classification test on the model once documents are added.

(iv) Summary, which provides a short summary of the options selected.

In one embodiment, the system enables exemplars to be converted into test documents.

In another embodiment, the system enables exemplars to be deleted or removed for a classification. Because a classification must always contain at least one exemplar, any command to delete the last remaining exemplar for a classification may cause the system to display a warning message stating that the classification will be removed along with the selected exemplar(s). Likewise, because a model requires at least one exemplar, the system may display a warning in response to a command to delete the last exemplar from a model.

Rules

Creating the classification model may optionally comprise defining at least one classification rule. Each rule comprises a rule priority determining an order in which rule is applied, a confidence level to be applied to a document when the document satisfies a condition specified by the rule and an applied classification that is to be applied to the document.

In addition to using exemplars, the system enables the user to add one or more rules to a model to help the auto-classification system accurately assign classifications to documents. In one embodiment, the system requires that there be at least one classification with at least one exemplar before a rule may be added, although in other embodiments this is not necessarily so.

In one main embodiment, a rule may be created by specifying: a rule name and a rule priority. The priority may be expressed as a number, e.g., the lower the number, the lower the priority. For example, given two rules with priorities of 99 and 50, the rule with the priority of 99 will run first, followed by the rule with a priority of 50. The rule may also specify a confidence level, which may, for example, range from Level 2 to Level 5 to represent the level of certainty that the user wants to apply to the document when the rule finds a matching document. In other words, the confidence level of a rule is based on the level of certainty the rule creator has that the conditions of the rule will match only documents that should receive the classification. The rule may also stipulate an applied classification, which is the classification the user wish to apply to a document when the specified conditions are met. The list is populated with the names of all classifications represented in the model.

Once the user has specified the parameters for the rule, the user can enter conditions that must be met for the rule to assign the selected classification to a document. The following parameters can be defined:

(i) Field Name, which allows the user to specify the part of the document that the user expects the text/information, as defined in the Value parameter below, to appear.

(ii) Operator, which allows the user to specify whether the Field Name parameter equals or does not equal, matches, or contains the text/information, as defined by the Value parameter below.

(iii) Value, which allows the user to enter text or other characters that the user wants found in the part of the document defined by the Field Name parameter.

In main embodiments, the system enables rules to be not only created but also viewed, changed (edited), and deleted.

Testing a Model for Accuracy

When a model has been created and contains exemplars, tools provided by the auto-classification system enable a user to run tests on the model to assess its accuracy. A test run may be performed on a small training corpus of documents that the user selects for this purpose. Based on a review collection, the system displays classification metrics on a metric panel from this test run to provide the user with feedback on the accuracy of the model. The metrics displayed in the metrics panel enable the user to optimize a model's accuracy.

The review collection is a set of non-classified documents from a content server on which a classification test is run. A review collection enables the user to compare the accuracy of a classification assigned by the auto-classification system (by applying the model) with the classification that the user would assign manually. Assigned classifications may be accepted or rejected. The user may specify an expected classification for each document that has been misclassified. Based on the manual review, the system will know which documents have been correctly classified and which documents have not.

Optionally, in addition to displaying various metrics, the system presents dynamic user feedback in the form of a guide presenting recommended actions for optimizing the accuracy of the model. This guide may be displayed on the user interface in the form of a panel, window, dialog box, etc. In most embodiments, the guide is displayed even if the accuracy is extremely high. Optionally, in other embodiments, the dynamic user feedback guide may be activated and displayed only when the accuracy falls below a predetermined threshold. For example, if the recall and/or precision values are below a predetermined threshold, the guide may be activated and displayed onscreen. The guide may comprise user interface elements (e.g., remedial action buttons that may be clicked or touched to display more details, help information, or to bring the user to the proper menu or tab, or to launch a function that performs or at least initiates the remedial action). In one embodiment, the guide may include any visual or audible alerts, flags or hints. For example, alerts, flags, or hints may be presented on the user interface when a value is below a predetermined or user-specified threshold.

In one embodiment, the guide may give hints, suggestions or recommendations on any potentially problematic exemplars and/or any potentially problematic rules. It may also be possible to view the exemplars and/or the rules that have been used and the proportion of matches and mismatches for each of the exemplars and/or rules. This detailed breakdown enables the user to refine the model by identifying and removing specific exemplars and/or by identifying and removing or editing specific rules.

Advanced semantic search techniques may also be employed in conjunction with auto-classification to enable the user to semantically navigate through the exemplars and the classified documents to thereby give the user a deeper understanding of the content and insight into how this content is being automatically classified. This insight enables the user to refine the model. For example, semantic search may enable the user to focus on the silence metrics for one particular classification. Exemplars and/or rules that have been utilized (and which are responsible for contributing to the silence metrics) can be displayed. The user can then refine the model by deleting and editing exemplars and/or rules to see how this affects the metrics, for example the silence metrics. In one embodiment, user interface elements for deleting and editing may be provided on the UI that displays the utilized exemplars/rules to facilitate the identification and selection of specific exemplars/rules that are to be deleted or edited.

Classifying Documents (Running a Classification Job)

After having created a model, assessed its accuracy, and having used a review collection to test the content server documents to classify, the user may then run a classification job to classify documents based on the model. Classification jobs may be run on groups of documents, entire databases, entire drives, subsets thereof or individually selected groups of documents.

When running the classification job, the auto-classification system may display metrics for the number of documents processed, the number that have been classified, the number that remain unclassified, the number that have been rejected and those assigned an uncertain status (which means the document was classified but with a low confidence level, e.g., a confidence level of 2 or 3). The auto-classification system may further display these metrics as the classifying is being performed and/or after the classification job is complete. The system may further display the metrics in various forms, such as for example graphs, charts, etc. The system may optionally further store metrics, e.g., accuracy, over time to permit the user to observe, e.g., via a graph or other such means, whether there is an improvement or degradation in the accuracy metrics.

Figure 5:
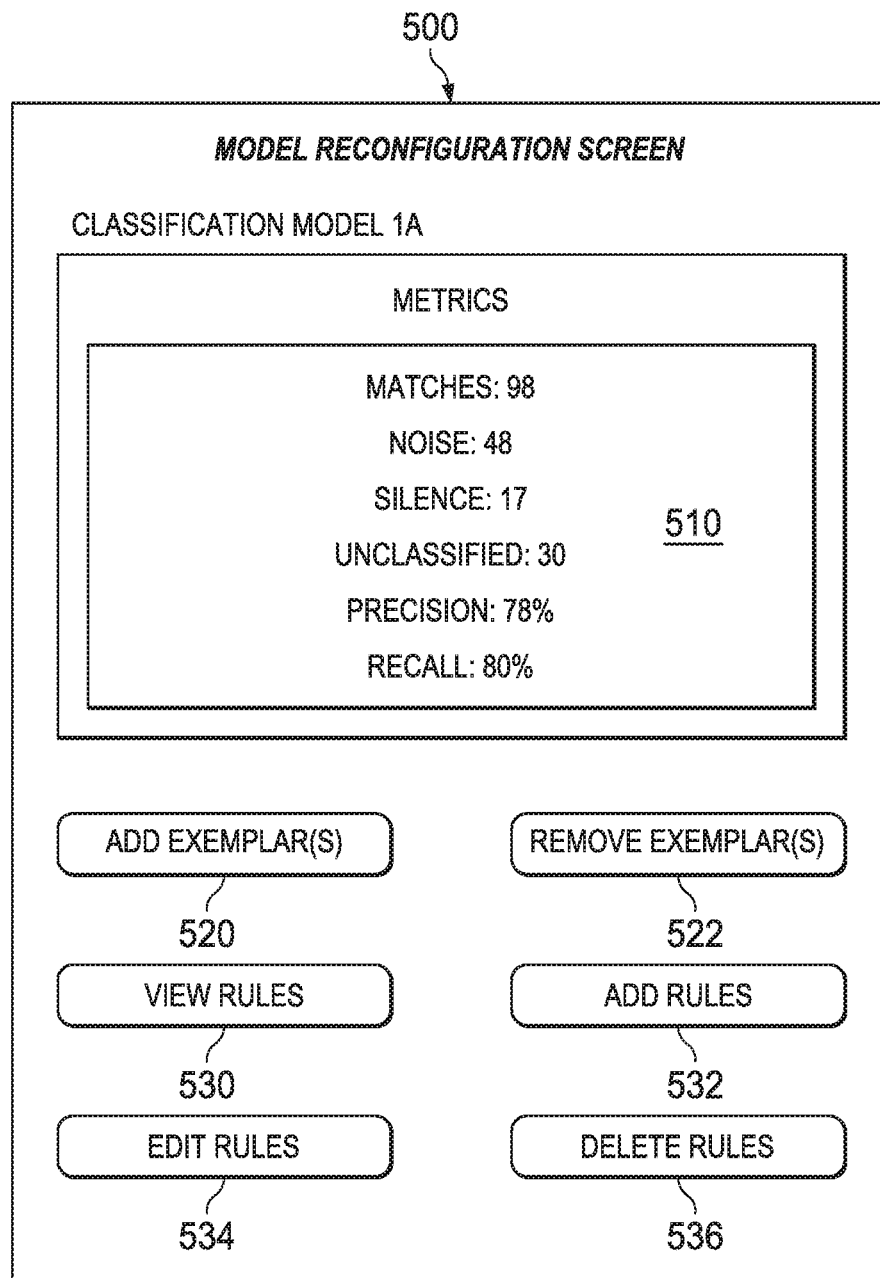
FIG. 5 is an example of a user interface within the auto-classification application that enables a user to reconfigure the auto-classification model.

FIG. 5 presents an example of a model reconfiguration screen 500 which may be displayed to the user to enable the user to reconfigure the classification model. This model reconfiguration screen may include, for example, a metrics display pane that displays metrics calculated for the test run performed on a sample or subset of documents. The metrics displayed in this pane may include, for example, matches, noise, silence, unclassified, precision and recall. The values are solely examples to illustrate the concept. The model reconfiguration screen 500 may include one or more user interface elements that are responsive to user input to cause the model to be reconfigured. For example, the user interface elements may include buttons, menus or any other such onscreen command-receiving element that the user clicks, touches or other activates to cause a command to be input to the computer. For example, the user interface elements may enable the user to reconfigure the classification model by changing the exemplars and/or the rules. As shown by way of example in FIG. 5, the screen may include an add exemplar button 520 and a remove exemplar button 522. The screen 500 may also include a view rules button 530, an add rules button 532, an edit rules button 534, and a delete rules button 536. Other user interface elements may be presented.

In one alternative embodiment, the system may permit the creation of a plurality of models which can be created, utilized and refined by different users at the same time. For example, this may be done by creating different versions of the same model. This would enable different users to employ different approaches, to view their own results and to concentrate on their own aspects of the classification model.

The technology disclosed herein enables the user to view performance metrics and to reconfigure the classification model to improve the accuracy of the model. The combination of detailed metrics and user-reconfigurability of this auto-classification system enhances the overall transparency and defensibility of the auto-classification process.

Any of the methods disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s). In a software embodiment, software components and modules may be implemented using standard programming languages including, but not limited to, object-oriented languages (e.g., Java, C++, C#, Smalltalk, etc.), functional languages (e.g., ML, Lisp, Scheme, etc.), procedural languages (e.g., C, Pascal, Ada, Modula, etc.), scripting languages (e.g., Perl, Ruby, Python, JavaScript, VBScript, etc.), declarative languages (e.g., SQL, Prolog, etc.), or any other suitable programming language, version, extension or combination thereof.

A computer-readable medium can be any non-transitory means that can contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a non-transitory computer-readable medium including, but not limited to, a floppy-disk, a CD-ROM, a DVD, RAM, ROM, EPROM, Flash Memory or any suitable memory card, etc.

The method may also be implemented in hardware. A hardware embodiment might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This inventive subject matter has been described in terms of specific embodiments, embodiments and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method of building a content classification model for automatically classifying digital content, the method comprising:
generating or modifying, by an auto-classification module embodied on non-transitory computer memory, a content classification model for classifying content, the content classification model containing example documents that have been taken in their entireties from a document source and that have been identified as exemplars for each classification in a hierarchical classification scheme;
reviewing, by the auto-classification module, the content classification model on a set of review documents to assess accuracy of the content classification model;
displaying, by the auto-classification module via a user interface, metrics for he set of documents that have been classified in the reviewing of the content classification model; and
determining, by the auto-classification module based at least in part on data received via the user interface, whether to run a classification job using the content classification model or to modify the content classification model by performing at least one of: adding a document as an exemplar to the content classification model, removing a document as an example from the content classification model, and replacing a document as an exemplar in the content classification model.

2. The method according to claim 1, further comprising:
importing an existing content classification model; and
modifying the existing content classification model by adding an exemplar to the existing content classification model, removing an exemplar from the existing content classification model, or changing an exemplar in the existing content classification model.

3. The method according to claim 1, further comprising:
modifying the content classification model by adding a content classification rule to the content classification model, deleting a content classification rule from the content classification model, or changing a content classification rule of the content classification model.

4. The method according to claim 1, further comprising:
in running the classification job, comparing characteristics of a piece of content under classification and of the exemplars in the content classification model; and
based on the characteristics indicating a sufficiently close match, assigning a classification in the hierarchical classification scheme to the piece of content.

5. The method according to claim 4, wherein the piece of content is stored on a client device having the non-transitory computer memory embodying the auto-classification module, on a server machine or removable memory device communicatively connected to the client device, in a cloud computing environment, or at a storage location accessible by the client device.

6. The method according to claim 1, further comprising:
presenting, via the user interface, a recommended action for a user to refine or reconfigure the content classification model.

7. The method according to claim 1, further comprising:
responsive to a sampling option being enabled, automatically and randomly selecting a set of exemplars in the content classification model to use as the set of review documents in the reviewing.

8. A computer program product for building a content classification model for automatically classifying digital content, the computer program product comprising a non-transitory computer-readable medium storing instructions translatable by a processor to implement an auto-classification module for:
generating or modifying a content classification model for classifying content, the content classification model containing example documents that have been taken in their entireties from a document source and that have been identified as exemplars for each classification in a hierarchical classification scheme;
reviewing the content classification model on a set of review documents to assess accuracy of the content classification model;
displaying, via a user interface, metrics for the set of documents that have been classified in the reviewing of the content classification model; and
determining, based at least in part on data received via the user interface, whether to run a classification job using the content classification model or to modify the content classification model by performing at least one of: adding a document as an exemplar to the content classification model, removing a document as an example from the content classification model, and replacing a document as an exemplar in the content classification model.

9. The computer program product of claim 8, wherein the instructions are further translatable by the processor to perform:
importing an existing content classification model; and
modifying the existing content classification model by adding an exemplar to the existing content classification model, removing an exemplar from the existing content classification model, or changing an exemplar in the existing content classification model.

10. The computer program product of claim 8, wherein the instructions are further translatable by the processor to perform:
modifying the content classification model by adding a content classification rule to the content classification model, deleting a content classification rule from the content classification model, or changing a content classification rule of the content classification model.

11. The computer program product of claim 8, wherein the instructions are further translatable by the processor to perform:
in running the classification job, comparing characteristics of a piece of content under classification and of the exemplars in the content classification model; and
based on the characteristics indicating a sufficiently close match, assigning a classification in the hierarchical classification scheme to the piece of content.

12. The computer program product of claim 8, wherein the instructions are further translatable by the processor to perform:

presenting, via the user interface, a recommended action for a user to refine or reconfigure the content classification model.

13. The computer program product of claim 8, wherein the instructions are further translatable by the processor to perform:

responsive to a sampling option being enabled, automatically and randomly selecting a set of exemplars in the content classification model to use as the set of review documents in the reviewing.

14. An auto-classification system for building a content classification model for automatically classifying digital content, the auto-classification system comprising:

a processor;
a non-transitory computer-readable medium; and
stored instructions translatable by the processor to implement an auto-classification module for:

generating or modifying a content classification model for classifying content, the content classification model containing example documents that have been taken in their entireties from a document source and that have been identified as exemplars for each classification in a hierarchical classification scheme;

reviewing the content classification model on a set of review documents to assess accuracy of the content classification model;

displaying, via a user interface, metrics for the set of documents that have been classified in the reviewing of the content classification model; and determining, based at least in part on data received via the user interface, whether to run a classification job using the content classification model or to modify the content classification model by performing at least one of: adding a document as an exemplar to the content classification model, removing a document as an example from the content classification model, and replacing a document as an exemplar in the content classification model.

15. The auto-classification system of claim 14, wherein the instructions are further translatable by the processor to perform:

importing an existing content classification model; and
modifying the existing content classification model by adding an exemplar to the existing content classification model, removing an exemplar from the existing content classification model, or changing an exemplar in the existing content classification model.

16. The auto-classification system of claim 14, wherein the instructions are further translatable by the processor to perform:

modifying the content classification model by adding a content classification rule to the content classification model, deleting a content classification rule from the content classification model, or changing a content classification rule of the content classification model.

17. The auto-classification system of claim 14, wherein the instructions are further translatable by the processor to perform:

in running the classification job, comparing characteristics of a piece of content under classification and of the exemplars in the content classification model; and based on the characteristics indicating a sufficiently close match, assigning a classification in the hierarchical classification scheme to the piece of content.

18. The auto-classification system of claim 17, wherein the piece of content is stored on a client device having the non-transitory computer memory embodying the auto-classification module, on a server machine or removable memory device communicatively connected to the client device, in a cloud computing environment, or at a storage location accessible by the client device.

19. The auto-classification system of claim 14, wherein the instructions are further translatable by the processor to perform:

presenting, via the user interface, a recommended action for a user to refine or reconfigure the content classification model.

20. The auto-classification system of claim 14, wherein the instructions are further translatable by the processor to perform:

responsive to a sampling option being enabled, automatically and randomly selecting a set of exemplars in the content classification model to use as the set of review documents in the reviewing.

* * * * *